Figure 1:
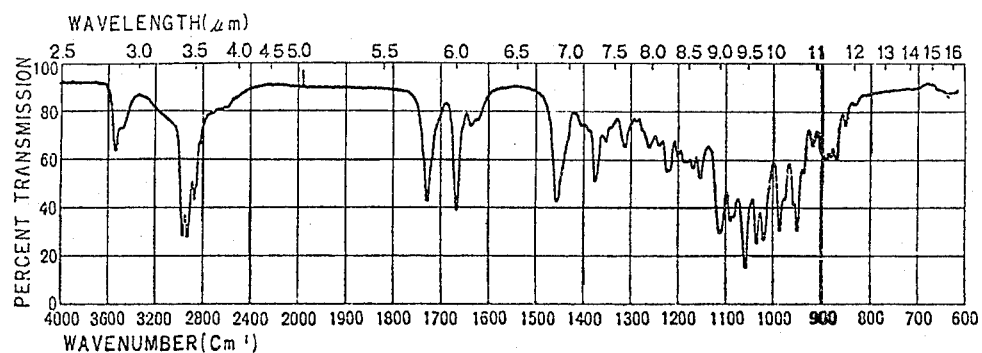

United States Patent [19]
Oikawa et al.

[11] 3,903,264
[45] Sept. 2, 1975

[54] ANTIBIOTIC A-130-A AND PRODUCTION THEREOF

[75] Inventors: Hiroshi Oikawa, Kusatsu; Harumoto Kawaguchi, Mie; Yoshimi Kawamura, Osaka, all of Japan

[73] Assignee: Shionogi & Co., Ltd., Osaka, Japan

[22] Filed: Dec. 27, 1973

[21] Appl. No.: 428,740

Related U.S. Application Data

[63] Continuation-in-part of Ser. No. 314,227, Dec. 11, 1972, abandoned.

[52] U.S. Cl.................................. 424/122; 195/80
[51] Int. Cl.². ........................................ A61K 35/00
[58] Field of Search ........................ 424/122; 195/80

[56] References Cited
OTHER PUBLICATIONS

Hamill et al., J. of Antibiotics, Vol. 22, No. 4, April 1969, pp. 161–164.

*Primary Examiner*—Jerome D. Goldberg
*Attorney, Agent, or Firm*—Wenderoth, Lind & Ponack

[57] ABSTRACT

A new antibiotic, A-130-A, being useful as a medicament for inhibiting the growth of gram-positive pathogenic microorganism and an anti-coccidial agent for poultry, and a process for preparing the same, being characterized by cultivating an A-130-A-producing strain of microorganism belonging to the Genus Streptomyces in an aqueous nutrient containing medium under aerobic conditions.

6 Claims, 3 Drawing Figures

ANTIBIOTIC A-130-A AND PRODUCTION THEREOF

This application is a continuation-in-part of Ser. No. 314,227, filed Dec. 11, 1972, now abandoned.

The present invention relates to a novel antibiotic, A-130-A, and production thereof.

In particular, the invention relates to a novel antibiotic, A-130-A, having antibacterial and anti-coccidial activities, and to a method for producting the antibiotic, A-130-A, characterized by cultivating an antibiotic A-130-A-producing strain of Streptomyces in an aqueous nutrient medium in submerged aerobic conditions and recovering A-130-A from the culture broth.

In the course of a search for new fermentation products, it has newly been discovered that a microorganism belonging to Streptomyces hygroscopicus species, indexed A-130 in the collection of Shionogi Research Laboratory, Shionogi & Co., Ltd., Osaka, Japan, and on deposit with the American Type Culture Collection under the accession number ATCC 21840, produces a new antibiotic, A-130-A, when cultivated in an aqueous nutrient medium in submerged aerobic conditions. In addition, it has been discovered that the antibiotic, A-130-A, is useful as an anti-coccidial agent for poultry. The present invention has been accomplished on the basis of these discoveries.

Accordingly, a fundamental object of the present invention is to provide a fermentation product, A-130-A. Another object of the present invention is to provide a process for the fermentative preparation of A-130-A. A further object of the present invention is to provide an anti-coccidial preparation for poultry which includes the said A-130-A as an active ingredient. A still further object of the present invention is to provide a method of using the said A-130-A as an anti-coccidial agent. These and other objects, which will be apparent from the subsequent description, are achieved by the present invention.

*Streptomyces hygroscopicus* A-130 was isolated from a soil sample collected at Ikeda city, Osaka Prefecture, Japan, in 1967, and shows the following morphological characteristics.

MORPHOLOGICAL CHARACTERISTICS

The morphology of the culture was studied after incubation at 28°C for 2 weeks on Bennett's agar. The colony is covered with abundant velvety or powdery aerial mycelia. Microscopic observation shows that the aerial mycelium is simply branched and forms side branches. Spore-bearing hyphae are spiral. The surface of a spore is spiny to warty, and spores are formed in chain, but non-segmented. Sporangium and flagellated spores are not observed, nor are fragmentation and sclerotia in vegetative mycelium observed.

CULTURAL CHARACTERISTICS

Observation was made over a 14 day's incubation period at 28°C. The results are shown in Table 1.

PHYSIOLOGICAL CHARACTERISTICS

Observation was made after incubation at 28°C for 14 days, and the results are shown in Table 2.

The microorganism grows under aerobic conditions, and the optimum pH range for growth is 6.0 to 8.0. However, the microorganism does not grow at temperatures of below 10°C or over 50°C.

Table 1

| Medium | Property | Result |
|---|---|---|
| Czapek agar | Growth | Good. |
| | VM | Pale yellow to pale yellowish brown. |
| | AM | Good, White. |
| | SP | None. |
| Glucose, Asparagine agar | Growth | Good. |
| | VM | Pale yellow to pale yellowish brown. |
| | AM | Good, brownish gray. |
| | SP | None. |
| Ca-malate agar | Growth | Considerably good. |
| | VM | Pale yellow to pale yellowish brown. |
| | AM | Considerably good, white. |
| | SP | None. |
| Glucose, czapek liquid | Growth | Considerably good. |
| | VM | Pale yellow to pale yellowish brown. |
| | AM | Considerably good, light brownish gray. |
| | SP | None. |
| Nutrient agar | Growth | Considerably good. |
| | VM | Pale yellow. |
| | AM | Considerably good, white. |
| | SP | None. |
| Glucose bouillon agar | Growth | Good. |
| | VM | Pale yellow. |
| | AM | Good, white. |
| | SP | None. |
| Loeffler serum | Growth | Good. |
| | VM | Pale yellow to pale yellowish brown. |
| | AM | Considerably good, light brownish gray. |
| | SP | None. |
| Potato plug | Growth | Good. |
| | VM | Brownish gray. |
| | AM | Good, grayish white. |
| | SP | Brownish gray. |
| Peptone, glucose agar | Growth | Considerably good. |
| | VM | Pale yellowish brown. |
| | AM | Considerably good, grayish white. |
| | SP | None. |
| Egg | Growth | Considerably good. |
| | VM | Pale yellowish brown. |
| | AM | Considerably good, white. |
| | SP | None. |
| Gelatin | Growth | Considerably good. |
| | VM | Brownish gray. |
| | AM | Considerably good, white to light brownish gray. |
| | SP | None. |
| Starch agar | Growth | Good. |
| | VM | Yellow. |
| | AM | Good, gray to light brownish gray. |
| | SP | None. |
| Tyrosine agar | Growth | Considerably good. |
| | VM | Pale yellowish brown. |
| | AM | Considerably good, white to grayish white. |
| | SP | None. |
| Skimed milk | Growth | Considerably good. |
| | VM | Pale yellowish brown. |
| | AM | None. |
| | SP | None. |
| Cellulose agar | Growth | Poor. |
| | VM | Colorless. |
| | AM | Good*, brownish gray. |
| | SP | None. |
| Bennett agar | Growth | Good. |
| | VM | Yellow to yellowish brown. |
| | AM | Good, brownish gray. |
| | SP | None. |
| Potato, peptone agar | Growth | Good. |
| | VM | Pale yellowish brown. |
| | AM | Good, white to light brownish gray. |
| | SP | None. |
| Maltose, yeast extract agar | Growth | Good.** |
| | VM | Yellow. |
| | AM | Good, brownish gray. |
| | SP | None. |
| Oat meal agar | Growth | Good.** |
| | VM | Pale yellow to pale yellowish brown. |
| | AM | Good, brownish gray. |
| | SP | None. |

Table 1 —Continued

| Medium | Property | Result |
|---|---|---|
| Glycerin, aspara-gine agar | Growth | Good. |
| | VM | Pale yellowish brown. |
| | AM | Good, brownish gray. |
| | SP | None. |

Note: *The growth is very poor, but the formation of aerial mycelium is good in the formed colonies.
**The strain becomes "hygroscopic" on the medium. VM = Vegetative mycelium; AM = Aerial mycelium; SP = Soluble pigment.

Table 2

| Property | Result |
|---|---|
| Liquefaction of gelatin | positive |
| Hydrolysis of starch | positive |
| Tyrosinase reaction | negative |
| Peptonization of milk | positive |
| Reduction of nitrate | positive |
| Decomposition of cellulose | negative |
| Production of melanoid pigment | negative |
| Acid formation from glucose | negative |
| Liquefaction on Loeffler serum medium | positive |

The utilization of carbon sources on the basal medium of Pridham and Gottlieb by the microorganism was observed after incubation at 28°C for 14 days. The results are shown in Table 3., wherein the mark "+" indicates good growth and positive utilization, and the mark "±" faint growth and probably faint utilization, and the mark "—" no growth and no utilization.

Table 3

| Carbon Source | Result |
|---|---|
| Glucose | + |
| D-Fructose | + |
| Mannose | + |
| L-Arabinose | + |
| L-Xylose | + |
| Lactose | + |
| Sucrose | + |
| Inositol | + |
| Rhamnose | + |
| Raffinose | + |
| Salicin | + |
| D-Mannitol | + |
| Glycerin | + |
| D-Galactose | + |
| Maltose | + |
| Dextrin | + |
| Inulin | + |
| Sorbose | ± |
| Sorbitol | — |
| Dulcitol | — |

From the above results, it is apparent that the strain should be classified as belonging to the Genus Streptomyces. Further, comparison of the morphological, cultural, and physiological characteristics among many species of Streptomyces described in "Bergey's Manual of Determinative Bacteriology", Waksman's "The Actinomyces" and other literature, shows that in most of its properties the said strain is very similar to *Streptomyces hygroscopicus* Waksman and Henrici 1948. Therefore, it is concluded that the strain of the present invention and *Streptomyces hygroscopicus* Waksman and Henrici 1948 are of the same species, and the microorganism of the present invention has been designated *Streptomyces hygroscopicus* A-130.

It is to be understood that for the production of A-130-A, the present invention is not limited to the use of *Streptomyces hygroscopicus* A-130. It is especially desired and intended to include the use of natural or artificial mutants or variants produced from the described organisms as far as they can produce the antibiotic, A-130-A. The artificial production of mutants or variants may be accomplished by a conventional operation such as X-ray or ultraviolet-ray irradiation, nitrogen mustards, 4-nitroquinoline N-oxide and other mutagens.

In the present invention, the new antibiotic, A-130-A, is produced during cultivation of the microorganism, e.g. *Streptomyces hygroscopicus* A-130, in an aqueous nutrient medium at a temperature of about 25° to about 45°C, preferably 25° to 35°C, under aerobic conditions. The composition of the nutrient medium may be varied over a very wide range. Essentially what is required is a carbon source, a nitrogen source, and trace inorganic elements. Examples of suitable carbon sources are glucose, sucrose, xylose, fructose, galactose, innositol, mannitol, glycerin, dextrin, starch, organic acids, molasses and the like. Suitable sources of nitrogen for the fermentation process include meat extract, peptone, soy bean meal, corn steep liquor, yeast extract, peanut meal, wheat gluten, cotton seed flour, rice bran, casamino acid (acid hydrolysate of casein), NZ amine (enzymatic hydrolysate of casein), ammonium sulfate, ammonium carbonate, ammonium chloride and the like. Examples of suitable sources of inorganic elements are mineral salts such as sodium chloride, potassium chloride, calcium carbonate, potassium phosphate and the like. The nutrient medium may or may not be adjusted to about pH 7.0 prior to inoculation of the microorganism. The pH tends to remain around said level during the fermentation, but, if variations are encountered, a buffering agent such as calcium carbonate may be added to the medium. In addition, if excessive foaming is encountered, anti-foaming agents such as vegetable oils, lard oil, and polypropyleneglycol may be added to the fermentation medium prior to or in the course of the fermentation. For a large scale of production, it is preferred to carry out the fermentation under submerged aerobic conditions. The maximum yields of the antibiotic A-130-A can be attained within about 20 to about 100 hours, usually about 70 hours, of fermentation under optimum conditions of temperature and aeration.

After growth of the microorganism, the antibiotic, A-130-A can be recovered from the culture broth by a per se conventional manner. The mycelium may be obtained from the fermentation broth by using standard equipment such as filter-press and centrifuge, and then antibiotic A-130-A may be recovered from the mycelium by a solvent extraction procedure. As antibiotic A-130-A is retained by the filtrate in a small quantity, a solvent extraction procedure is preferably used to recover the antibiotic from the filtrate, or from the whole broth without removal of the filtrate. Suitable extraction solvents include methanol, ethanol, acetone, chloroform, ether, methylene chloride, benzene, n-hexane, ethyl acetate and the like. For extraction of the antibiotic from a large volume of broth, however, a filtration procedure is superior to a direct solvent extraction procedure. For instance, the whole broth may be filtered after the addition of a filter aid, such as Hyflo Super Cel (diatomaceous earth), and the resulting cake of filter aid and mycelium may be eluted with a suitable organic solvent such as chloroform, ethanol, or methanol, to extract the antibiotic. The extract may be concentrated and a suitable solvent such as water added to precipitate the crude active component.

The thus obtained crude active component may be further purified, if desired, by suitable operations such as recrystallization, chromatography and the like. For example, recrystallization may be carried out by dissolving the crude material in an organic solvent such as methanol, ethanol, and then adding water to the solution. The preferred chromatographic adsorbents are silica gel, silicic acid and the like. Further, antibiotic A-130-A may be converted into a salt suitable for a purification procedure such as ammonium salt, sodium salt, potassium salt, a heavy metal salt and the like.

Antibiotic A-130-A in a free acid form is a colorless amorphous powder melting at 87° to 92°C. It is very soluble in methanol, ethanol, ethyl acetate, chloroform, methylene chloride, acetone, benzene and ether, soluble in hexane, but insoluble in water. The elemental analytical values of A-130-A dried at 100°C in vacuo to constant weight are C, 66.47%; H, 9.15%; O, 24.07%. The molecular weight of A-130-A is 850 mass spectrometry. These values suggest a possible molecular formula $C_{47}H_{78}O_{13}$ for A-130-A. The specific rotation of A-130-A is $[\alpha]_D^{23} + 64.5°$ ($c = 1.0$ in chloroform). The ultraviolet absorption spectrum in methanol is characterized by an absorption at 234.5 m$\mu$ ($\epsilon$ 14,200). The infrared absorption spectrum of A-130-A, run in a chloroform solution, shows the following frequencies: 3535, 1734, 1671, 1642 cm$^{-1}$(shown in the accompanying drawing, FIG. 1). The nuclear magnetic resonance spectrum of A-130-A in deuterochloroform ($CDCl_3$) at 60 Mc is shown in the accompanying drawing, FIG. 3. Antibiotic A-130-A gives positive Dragendorff, and negative ferric chloride reaction and decolorizes potassium permanganate.

The sodium salt of antibiotic A-130-A exists as colorless needle like crystals melting at 227°–231°C. It is very soluble in methanol, ethanol, ethyl acetate, chloroform and methylene chloride, is soluble in ether, benzene, acetone and tetrachloroethane, and is insoluble in water and petroleum ether. The analytical values of the Na salt dried at 100°C in vacuo to constant weight are C, 64.71%; H, 8.90%; Na, 2.92 %, O, 23.47%; molecular weight, 872 (by mass spectrometry), 854 (by osmometry in chloroform). These analyses suggest a possible molecular formula $C_{47}H_{77}O_{13}$ Na for the Na salt of A-130-A. The specific rotation of the Na salt of A-130-A is $[\alpha]_D^{23} + 97.9°$ ($c = 1.0$ in chloroform). The ultraviolet absorption spectrum in methanol is characterized by an absorption at 235 m$\mu$ ($\epsilon$ 14,700). The infrared absorption spectrum of the Na salt of A-130-A, run in Nujol, shows the following frequencies; 1661, 1640, 1562 cm$^{-1}$ (shown in the accompanying drawing, FIG. 2).

On the basis of the above physical and chemical properties, antibiotic A-130-A is considered to have $\alpha$, $\beta$- unsaturated ketone structure and a polycyclic polyether structure; it is different from any known antibiotic available for comparison. It was confirmed by direct comparison that antibiotic A-130-A is different from Dianemycin, which contains an $\alpha,\beta$- unsaturated ketone structure in the molecule and has properties similar to the antiniotic A-130-A (R. L. Hamill et al., The Journal of Antibiotics, 22, 161, 1969). Therefore, antibiotic A-130-A is a new compound.

Antibiotic A-130-A shows activity against a variety of microorganisms. The in vitro antimicrobial activity of the antibiotic was determined by the agar streak dilution method or by the tube dilution method. The results are shown in Table 4.

Table 4

| Test Organism | Minimum Inhibitory Concentration (mcg/ml) |
| --- | --- |
| Bacillus subtilis PCI 219 | 1.25 |
| Bacillus anthracis | 1.25 |
| Staphylococcus aureus 209P JC-1 | 2.5 |
| Staphylococcus aureus 60658 | 2.5 |
| Streptococcus pyogenes C-203 | 0.625 |
| Streptococcus faecalis | 1.25 |
| Viridans streptococci | 0.625 |
| Diplococcus pneumoniae type I | 0.625 |
| Corynebacterium diphteriae Tront | 0.625 |
| Escherichia coli NIHJ JC-2 | >20 |
| Escherichia coli 60368 | >20 |
| Pseudomonas aeruginosa Denken | >20 |
| Klebsiella pneumoniae | >20 |
| Salmonella typhimurium | >20 |
| Mycobacterium tuberculosis H 37 Rv | 2.5 |
| Trichophyton rubrum | >20 |
| Candida albicans M-9 | >20 |
| Trichomonas vaginalis 4F | 10 |

It is seen from Table 4 that antibiotic A-130-A is highly active against gram-positive bacteria.

Acute toxicity studies on antibiotic A-130-A were carried out in mice, and the $LD_{50}$ value was found to be 2.52 mg/kg intraperitoneally.

The new antibiotic A-130-A is useful as a medicament for inhibiting the growth of gram-positive pathogenic microorganism. It is also useful for sterilizing equipment, for example surgical instruments.

In addition, antibiotic A-130-A is useful as an anticoccidial agent in prophylaxis and/or therapy. Avian coccidiosis due to Eimeria tenella, Eimeria necatrix, or Eimeria acervulina induces lesions in the digestive organs, general prostration, death and growth inhibition in poultry such as chicks, turkeys, or ducks. Compounds heretofore used as anti-coccidial agents include sulfa drugs, nitrofurans, quinolines, anti-thiamine agents, benzamides and antibiotic substances. These known anti-coccidial agents suffer from some drawbacks in their degree of anti-coccidial activity, and by the emergence of strains having drug resistance owing to misuse of the drugs over a long period. Such factors have gradually decreased the value of the known drugs. Advantages of the present invention consist in that antibiotic A-130-A shows very powerful anti-coccidial activity for both prophylaxis and treatment of the disease.

For anti-coccidial compositions comprising antibiotic A-130-A, suitable preparations which may be used include: powders, granules, solutions, dispersions, premixes, capsules, emulsions, tablets, etc. The compound may be used singly or in combination with an appropriate carrier ordinarily used in this field. The ordinary additives, vehicles, disintegrating agents, lubricants, and coating materials can also be combined therewith. In general, a suitable concentration of antibiotic A-130-A for polutry feed is at least 0.001 weight %. For prophylactic use, suitable concentration of A-130-A is about 0.001 to about 0.06 weight %, more favorably about 0.003 to about 0.02 weight %, and for therapeutic purpose a suitable concentration is about 0.01 weight % to about 0.3 weight %. A solution, suspension, or emulsion may be added to drinking water; capsules or tablets may be administered orally as they are. If a carrier is employed, a diluent ordinarily added to poultry feed may be used, for example water, lactose, sucrose, talc, pectin, wheat powder, rice bran, wheat bran, corn powder, soy bean meal, crushed grain powder and the like. The present anti-coccidial composition may be optionally used in combination with animal drugs including the other antibiotics or the other known anthelmintics.

Further, the ammonium salt of antibiotic A-130-A, or it's metal salts such as sodim salt, potassium salt, calcium salt, magnessium salt, aluminum salt and the like, may also be used as anti-coccidial agents for poultry.

The practical effects of the anti-coccidial agent of the invention are shown by the following experiments.

EXPERIMENT 1 a. Test method:

Several groups of test animals, each group consisting of 10 White Leghorn chicks, were orally infected with 50000 sporulated oocysts of *Eimeria tenella* per chick. The test animals were given feed containing the test antibiotic, A-130-A, for 8 consecutive days after infection. On the 8th day, the test animals were anatomized, and caecal lesions were observed. During the period of administration of A-130-A, the number of the hematochezia, survival ratio, relative weight gain, the number of oocysts, and caecal lesion score were determined.

b. Results

The results of the test against caecal coccidiosis due to *Eimeria tenella* in White Leghorn chicks are shown in Table 5.

EXPERIMENT 2 a. Test method

Several groups of the test animals, each group consisting of 10 White Leghorn chicks, were orally infected with 500,000 sporulated oocysts of *Eimeria acervulina* per chick. In order to investigate the effect of prophylaxis for chick coccidiosis, the test animals were given feed containing the test antibiotic, A-130-A, for 5 consecutive days after infection. On the other hand, in order to investigate the effect of therapy for chick coccidiosis, the test animals were given feed containing A-130-A for 2 consecutive days after 3 days of infection. On the 5th day, the test animals were anatomized, and the number of oocysts or gamatocytes in the mucous menbrane of the small intestines was investigated. During the period of administration of A-130-A, the number of oocysts, survival ratio, and relative weight gain were determined.

b. The results of the test against coccidiosis due to *Eimeria acervulina* in White Leghorn chicks are shown in Table 6.

As clearly shown in the above results, A-130-A shows very powerful anti-coccidial activity for both prophylaxis and treatment of the disease.

The following examples are given solely for the purpose of illustration and are not to be construed as limitative of the present invention, many variations of which are possible.

Table 5

| Antiobiotic | Concn. (%) in feed | Total of hematochezia* | Survival ratio (%) | Relative weight gain (%)** | Number of oocyst (O.P.G.)*** | Caecal lesion Score**** |
|---|---|---|---|---|---|---|
| A-130-A | 0.025 | 0 | 100 | 4 | 0 | 0 |
|  | 0.0125 | 0 | 100 | 56 | 0 | 0 |
|  | 0.0063 | 9 | 100 | 91 | $1.4 \times 10^5$ | 3 |
| Control | (a) | ∞ | 70 | 81 | $3.4\,033\,10^5$ | 40 |
|  | (b) | 0 | 100 | 100 | 0 | 0 |

Note: *) shows the total count of hematochezia per 10 chicks; and ∞ means that the number was too large to count.
**) shows the ratio of the increased body weight of chicks in treated groups or infected control group to that of chicks in the uninfected control group.
***) shows the count of oocysts existing per gram of feces in chicks on the 7th day after infection, abbreviated as O.P.G.
****) shows the degree of pathological change in the caeca. Surviving chicks were anatomized on the 8th day after infection, and the degree of pathological change in the caeca was observed macroscopically. Degrees of pathological change in the caeca were classified into 5 orders from 0 to 4 (Serious, 4; considerable, 3; moderate, 2; slight, 1; almost sound, 0). Total (0 to 40) of the score were calculated for each group of 10 chicks.
(a) : Infected case.
(b) : Uninfected case.

Table 6

| Antiobiotic | Concn. (%) in feed | Period of administration | Survival ratio (%) | Relative weight gain (%)* | Number of oocyst (O.P.G)** | *** Number of oocyst or gametocytes in a mucous membrane of a small intestines |
|---|---|---|---|---|---|---|
| A-130-A | 0.01 | administration for 5 consecutive days after infection | 100 | 32 | 0 | 0/10 |
|  | 0.005 |  | 100 | 79 | $4 \times 10^4$ | 2/10 |
|  | 0.0025 |  | 100 | 121 | $7.8 \times 10^5$ | 10/10 |
|  | 0.0013 |  | 100 | 111 | $1.6 \times 10^6$ | 10/10 |
|  | 0.02 | administration for 2 consecutive days after 3 days of infection | 100 | 50 | 0 | 1/5 |
|  | 0.01 |  | 100 | 92 | $8 \times 10^4$ | 3/5 |
| Control | (a) |  | 100 | 53 | $1.2 \times 10^7$ | 10/10 |
|  | (b) |  | 100 | 100 | 0 | 0/10 |

Note: *) shows the ratio of the increased body weight of chicks in treated groups or infected control group to that of chicks in the uninfected control group.
**) shows the oocyst count per gram of feces on the 5th day after infection, abbreviated as O.P.G.
***) Number of oocysts or gametocytes/test animal
(a) : Infected case.
(b) : Uninfected case.

EXAMPLE 1

*Streptomyces hygroscopicus* A-130 ATCC No. 21840 is inoculated in to a nutrient medium composed of 5 g of meat extract, 5 g of peptone, 10 g potato starch, 2.5 g of yeast extract, 5 g of sodium chloride and 1 liter of distilled water, and incubated at 28°C for 48 hours. The thus cultured broth is used as inoculum.

15 liters of a nutrient medium (pH 7.0) composed of 12 g of potato starch, 12 g of soy bean meal, 6 g of corn steep liquor, 6 g of glycerin, 3.6 g of sodium chloride, and 4.2 g of calcium carbonate is sterilized and inoculated with the inoculum prepared above. The cultivation is performed at 29°C for 65 hours under agitation and aeration of 15 liters per minute, until the concentration of A-130-A amounts to maximum yield.

About 105 liters of the cultured broth are adjusted to pH 4.0 with 10% of hydrochloric acid under vigorous stirring and filtered by the aid of Hyflo Super Cel (3.5 Kg). The filtrate is extracted with ethyl acetate. On the other hand, the resulting cake containing the filter aid and mycelium is extracted with acetone and the acetone solution is evaporated under reduced pressure. The residue is extracted with ethyl acetate. The ethyl acetate extracts are combined, washed with 2% sodium hydroxide solution and subsequently with water, dried with anhydrous sodium sulfate, and evaporated under reduced pressure. The residue (about 105 g) is dissolved in 500 ml of a mixture of two volumes of ether and one volume of n-hexane, and the solution is allowed to stand at room temperature overnight.

The solution is filtered, then evaporated under reduced pressure. The residue (about 66 g) is dissolved in chloroform and chromatographed on 600 g of silicic acid, and eluted with chloroform-methanol (49 : 1) and subsequently with chloroform-methanol (25 : 1). The fractions containing A-130-A are collected and concentrated under reduced pressure. The resulting residue (about 40.2 g) is dissolved in ethyl acetate. The solution is washed with 3% of hydrochloric acid and subsequently with water, dried with anhydrous magnesium sulfate, and then evaporated under reduced pressure. The residue is dissolved in n-hexane and then the solution is filtered to remove the precipitate. The filtrate is evaporated under reduced pressure. The residue is dissolved in ethyl acetate, washed with 2% sodium hydroxide solution and subsequently with 2% sodium chloride solution, dried with anhydrous sodium sulfate, and then evaporated under reduced pressure to give 25.4 g of residue. The residue is dissolved in acetone and precipitated by addition of water to give 9.98 g of pure A-130-A sodium salt as colorless needle like crystals.

A-130-A sodium salt is dissolved in ether, and shaken with 2% hydrochloric acid. The ether layer is washed with water, dried with anhydrous sodium sulfate, and evaporated under reduced pressure to give pure A-130-A free acid as a colorless amorphous powder.

EXAMPLE 2

A-130-A is admixed with 10 times its weight of lactose. The mix is diluted with chicken feed to a concentration of 0.01 to 0.3% of the effective ingredient in the feed before use.

EXAMPLE 3

A-130-A (10 parts by weight) is admixed with sucrose or starch (90 parts by weight) to give a homogeneous mix. The mix is diluted with chicken feed to a concentration of 0.01 to 0.3% of the effective ingredient in the feed before use.

EXAMPLE 4

A-130-A (25 parts of weight) is admixed with wheat powder (75 parts by weight) to give a homogenous mix. The mix is diluted with chicken feed to a concentration of 0.01 to 0.3% of the effective ingredient in the feed before use.

EXAMPLE 5

Na salt of A-130-A (45 parts of weight) is admixed with sucrose (12 parts by weight), starch (15 parts by weight), talc (25 parts by weight), magnesium stearate (2 parts by weight) and stearic acid (1 parts by weight). The mix is made into granules, which are then compressed to give tablets.

Figure 3:
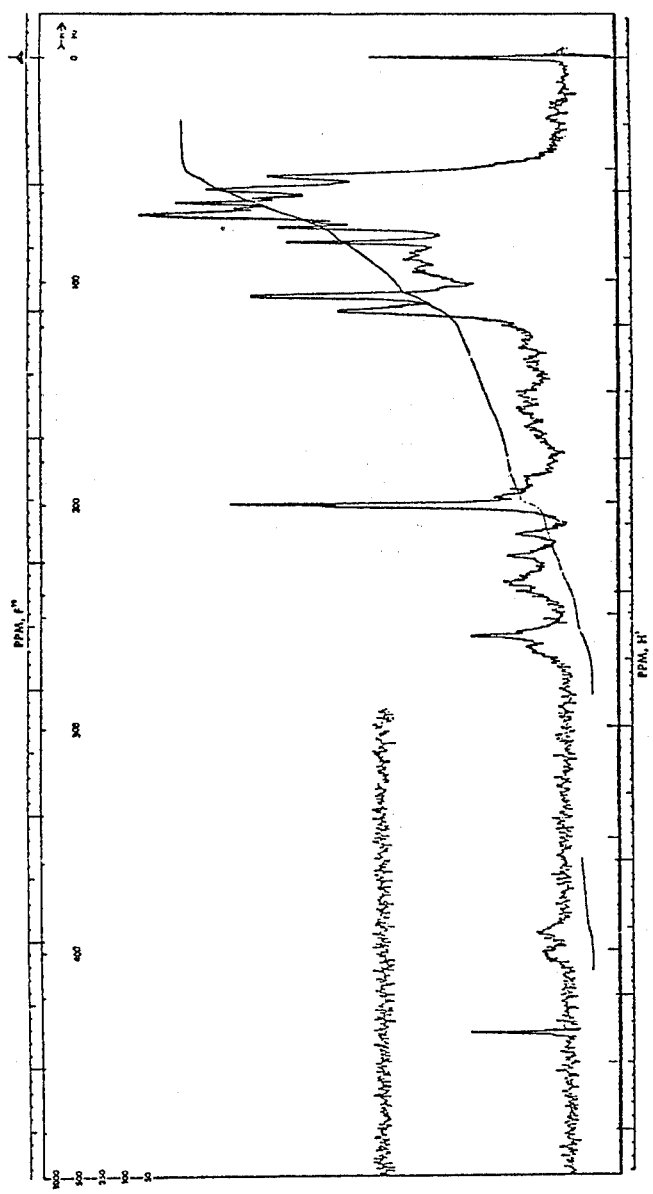

What is claimed is :

1. An antibiotic, A-130-A, effective in inhibiting the growth of gram-positive microorganisms and *Eimeria*, the said antibiotic being a colorless amorphous powder melting at 87° to 92°C, containing the elements carbon, hydrogen and oxygen in substantially the following proportions by weight:

| | |
|---|---|
| Carbon | 66.47 % |
| Hydrogen | 9.15 % |
| Oxygen | 24.07 % | having an optical rotation of $[\alpha]_D^{23} + 64.5°$ ($c=1.0$ in chloroform), a molecular weight of about 850 and showing the infrared absorption spectrum as in the attached drawing, FIG. 1, and the nuclear magnetic resonance spectrum as in the attached drawing, FIG. 3.

Figure 2:
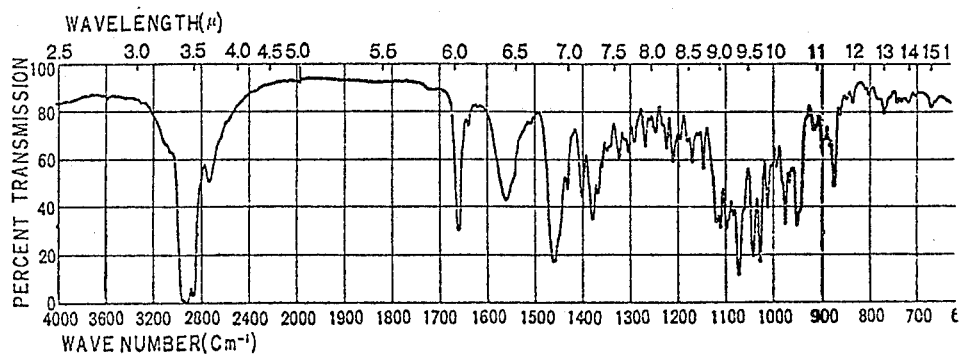

2. An antibiotic, Na salt of A-130-A, effective in inhibiting the growth of gram-positive microorganisms and *Eimeria*, the said antibiotic being a colorless needle like crystal melting at 227°–231°C containing the elements carbon, hydrogen, sodium and oxygen in substantially the following proportions by weight:

| | |
|---|---|
| Carbon | 64.71 % |
| Hydrogen | 8.90 % |
| Sodium | 2.92 % |
| Oxygen | 23.47 % | having an optical rotation of $[\alpha]_D^{23}+97.9°$ ($c=1.0$ in chloroform), having a molecular weight of 872 determined by mass spectrometry and 854 determined by osmometry in chloroform, the ultraviolet absorption spectrum showing a peak at 235 m$\mu$ ($\epsilon$ 14,700) in methanol, and the infrared absorption spectrum as in the attached drawing, FIG. 2.

3. A process for producing the antibiotic A-130-A as defined in claim 1, which comprises cultivating *Streptomyces hygroscopicus* A-130 (ATCC No. 21840) in an aqueous nutrient medium at a temperature from about 25° to about 45°C for about 20 to about 100 hours under aerobic conditions, adjusting the pH of the resultant culture broth to about 4.0, adding a filter aid to the culture broth, filtering the resultant culture broth, thus obtaining a filter cake containing a mixture of the filter aid and mycelium, and extracting the antibiotic A-130-A from the filter cake with a solvent selected from the group consisting of methanol, ethanol, acetone, chloroform, ether, methylene chloride, benzene, n-hexane and ethyl acetate.

4. The process according to claim 3, further comprising extracting the antibiotic A-130-A from the filtrate obtained during filtration with a solvent selected from the group consisting of methanol, ethanol, acetone, chloroform, ether, methylene chloride, benzene, n-hexane and ethyl acetate, to obtain an additional quantity of the antibiotic A-130-A.

5. A pharmaceutical composition for prophylaxis and treatment of avian coccidiosis, comprising an effective amount of the antibiotic A-130-A as defined in claim 1 for prophylaxis and treatment of avian coccidiosis in the free acid form, or its sodium salt, as an active ingredient in admixture with a pharmaceutically acceptable carrier.

6. A pharmaceutical composition according to claim 5, in which the amount of active ingredient is in the range from 0.001 weight % to 1.0 weight % of the composition.

* * * * *